US012472975B1

United States Patent
Hou et al.

(10) Patent No.: US 12,472,975 B1
(45) Date of Patent: Nov. 18, 2025

(54) BODY-CONTACT SAFETY WARNING SYSTEM BASED ON POTENTIAL RISK OF AUTOMATIC DRIVING

(71) Applicant: Qiyuan Hou, Hangzhou (CN)

(72) Inventors: Qiyuan Hou, Hangzhou (CN); Yuzhu Cao, Hangzhou (CN)

(73) Assignee: Qiyuan Hou, Hangzhou (CN)

( * ) Notice: Subject to any disclaimer, the term of this patent is extended or adjusted under 35 U.S.C. 154(b) by 0 days.

(21) Appl. No.: 19/015,327

(22) Filed: Jan. 9, 2025

(30) Foreign Application Priority Data

Dec. 10, 2024 (CN) .......................... 202411817889.2

(51) Int. Cl.
| | | |
|---|---|---|
| *B60W 50/16* | (2020.01) | |
| *G06V 10/30* | (2022.01) | |
| *G06V 10/44* | (2022.01) | |
| *G06V 20/58* | (2022.01) | |
| *B60W 50/14* | (2020.01) | |

(52) U.S. Cl.
CPC .............. *B60W 50/16* (2013.01); *G06V 10/30* (2022.01); *G06V 10/449* (2022.01); *G06V 20/58* (2022.01); *B60W 2050/146* (2013.01); *B60W 2420/403* (2013.01); *B60W 2520/105* (2013.01); *B60W 2556/10* (2020.02)

(58) Field of Classification Search
CPC ..... B60W 50/16; G06V 10/30; G06V 10/449; G06V 20/58
USPC .......................................................... 701/310
See application file for complete search history.

(56) References Cited

U.S. PATENT DOCUMENTS

| | | | | |
|---|---|---|---|---|
| 6,498,976 | B1 * | 12/2002 | Ehlbeck ............. | B60G 17/0195 701/72 |
| 2006/0284839 | A1 * | 12/2006 | Breed ................... | B60W 50/16 345/156 |
| 2014/0111647 | A1 * | 4/2014 | Atsmon ................... | G08G 1/14 348/148 |
| 2015/0127212 | A1 * | 5/2015 | Chacon ................... | G01S 19/14 701/32.4 |
| 2023/0142299 | A1 * | 5/2023 | Pan ....................... | G01S 13/931 701/301 |
| 2025/0162551 | A1 * | 5/2025 | Im ........................... | B60T 8/172 |

FOREIGN PATENT DOCUMENTS

| | | |
|---|---|---|
| CN | 107554422 A | 1/2018 |
| CN | 212054056 U | 12/2020 |
| CN | 116587979 A | 8/2023 |

* cited by examiner

*Primary Examiner* — Jacob S. Scott
*Assistant Examiner* — Michael E Butler
(74) *Attorney, Agent, or Firm* — George D. Morgan (57) ABSTRACT

Disclosed is a body-contact safety warning system based on a potential risk of automatic driving. The system includes a data receiving module, a data processing module, a safety warning module and a terminal interaction module; where the data receiving module is used for receiving data to obtain an image data set, a vehicle motion data set and communication transmission data; the data processing module is used for calculating to obtain a visual risk early warning degree, a predicted vehicle body stability degree and a communication data packet distortion degree; the safety warning module is used for performing classification judgment to obtain an early warning result and sending a vibration early warning; and the terminal interaction module is used for providing the user with a visual interaction page, receiving instructions and storing data.

9 Claims, 1 Drawing Sheet

BODY-CONTACT SAFETY WARNING SYSTEM BASED ON POTENTIAL RISK OF AUTOMATIC DRIVING

CROSS-REFERENCE TO RELATED APPLICATIONS

The application claims priority to Chinese patent application No. 2024118178892, filed on Dec. 10, 2024, the entire contents of which are incorporated herein by reference.

TECHNICAL FIELD

The present invention relates to the technical field of automatic driving, and more particularly, to a body-contact safety warning system based on a potential risk of automatic driving.

BACKGROUND

In recent years, with the innovative achievements in the fields of information technology, integrated circuit technology and artificial intelligence technology, assisted automatic driving technologies of intelligent networked vehicles have been rapidly developed. In the closed scenes represented by expressways and open scenes represented by urban roads, L2+ level of intelligent auxiliary driving has been put in practice, and higher-level automatic driving and unmanned driving are the development trend of automobiles. At present, there are many problems to be solved in developing the automatic driving technique to be mature, and there are still some deficiencies in the automatic driving system. In a considerable period of time in the foreseeable future, in practical operation, the vehicle equipped with intelligent driving assistance or automatic driving may have the problems of complex external traffic environment, vehicle sensor failure, network signal disconnection and artificial intelligence judgment error, and there is an objective need to take over the driving temporarily. Therefore, it is of great significance to judge the risk of running the automatic driving system and prompt the driver to take over the vehicle manually in time. Because automatic driving has the feature that it does not require driver intervention, drivers tend to be deeply distracted, focusing on watching, chatting with passengers or using mobile phones, etc. The intensity of traditional acousto-optic reminding is difficult to control, too strong acousto-optic reminding easily cause additional interference, too weak acousto-optic reminding easily lead to low efficiency of early warning. In addition, it is specified that the driver still needs to hold the steering wheel during the low-level auxiliary driving operation such as L2/L3, but there is a case where both hands of the driver are separated from the steering wheel in practice, and the early warning method based on steering wheel vibration is likely to be ignored. Therefore, in view of the potential risks of the current automatic driving system, the development of body-contact safety warning system based on seat belt and seat vibration is helpful to give full early warning and provide the basis for scientifically defining the responsibility attribution of automatic driving accidents, which is a promising technical direction.

At present, a Chinese invention patent application with the application number CN202411327794.2 discloses a safety warning method and system for automatic driving of a vehicle, and the application includes: acquiring surrounding environment information of an automatic driving vehicle, where the surrounding environment information includes type, position, speed, acceleration and moving direction of an obstacle, and determining a self-vehicle urgency according to the surrounding environment information analysis; acquiring driver state information within a current pre-set time period, and analyzing and determining a current driving attention degree of a driver according to the driver state information; generating a safety degree according to the self-vehicle urgency degree and the current driving attention degree, and executing a corresponding safety prompt instruction according to the safety degree. The application determines whether to generate a safety prompt instruction according to the actual driving state and the self-vehicle urgency of the driver, provides a flexible prompt mode, reduces unnecessary prompts on the basis of the actual driving state, and ensures the driving safety at the same time. However, the present application needs to calculate a trajectory according to the vehicle environment when giving early warning to the driver. The complexity of data processing is high and the function of the vehicle's own automatic driving system is repeated. At the same time, the present application does not fully consider the situation that the acousto-optic early warning is easily ignored when the driver is distracted during automatic driving and lacks the linkage with the safety protection measures for the driver.

SUMMARY

The technical problem to be solved by the present invention is: when a traditional method is used to give early warning to the vehicles in automatic driving state, specific road conditions image, laser radar data and millimeter wave radar data are calculated and analyzed, and the computational complexity is high and the function of the automatic driving system is repeated. The problem of the received complex sensor data such as camera and radar is not fully considered. The intensity of traditional acousto-optic reminding is difficult to control and easily overlooked by drivers, and lack of linkage with safety protection measures for drivers.

In order to solve the above technical problem, the present invention provides the following technical solutions:
a body-contact safety warning system based on a potential risk of automatic driving, which includes a data receiving module, a data processing module, a safety warning module and a terminal interaction module; where
the data receiving module includes an image data receiving unit used for receiving a real-time image acquired by the vehicle-mounted camera to obtain an image data set, a motion data receiving unit used for receiving the vehicle motion data set acquired by a vehicle motion sensor and a transmission data receiving unit used for receiving communication transmission data transmitted by a vehicle automatic driving system from a communication transmission interface;
the data processing module includes an image data analysis unit used for calculating the image data set to obtain a visual risk early warning degree, a motion data analysis unit used for calculating the vehicle motion data set to obtain a predicted vehicle body stability degree and a transmission data analysis unit used for analyzing and calculating communication transmission data to obtain a communication data packet distortion degree and special instruction data;
the safety warning module includes a classification early warning unit used for performing classification judgment according to the visual risk early warning degree, the predicted vehicle body stability degree, the communication data packet distortion degree and the special instruction data to obtain an early warning result, and a physical vibration unit used for sending a safety warning to a driver according to the early warning result; and the terminal interaction module includes an interaction unit and a storage unit used for providing a visual interaction page to a user and receiving a user operation instruction, and storing received data of the data receiving module, output data of the data processing module, output data of the safety warning module and output data of the interaction unit data.

As a preferred embodiment of a body-contact safety warning system based on a potential risk of automatic driving according to the present invention, where the image data receiving unit is used for receiving a real-time image acquired by the vehicle-mounted camera to obtain an image data set, and the vehicle-mounted camera includes a front view camera, a rear-view camera, a surround view camera and a side view camera;

the motion data receiving unit is used for receiving the vehicle motion data set acquired by the vehicle motion sensor, where the vehicle motion sensor includes a speed sensor, an acceleration sensor, a gyroscope and a pressure sensor, and the vehicle motion data set includes vehicle speed data, horizontal acceleration data, vertical acceleration data, rotational angular velocity data and vertical load force data;

the transmission data receiving unit is used for acquiring communication transmission data transmitted by the vehicle automatic driving system from the communication transmission interface, where the communication transmission interface includes a vehicle-mounted sensor data API, vehicle condition information API, a map platform API and a software application supporting API, and the communication transmission data includes vehicle-mounted sensor transmission data, vehicle condition information transmission data, map platform transmission data and software application supporting transmission data.

As a preferred solution of a body-contact safety warning system based on a potential risk of automatic driving according to the present invention, where the image data analysis unit is used for calculating the image data set to obtain a visual risk early warning degree, sampling the image data set via a first sliding window with a pre-set K frame length to obtain a sampling image set, respectively adding a corresponding time stamp to each frame image in the sampling image set to obtain an image sequence to be analyzed, performing grey-scale mapping on the image sequence to be analyzed via a weighted average method to obtain a grey-scale image to be analyzed, and calculating to obtain the visual risk early warning degree via the grey-scale image to be analyzed.

As a preferred embodiment of a body-contact safety warning system based on a potential risk of automatic driving according to the present invention, the calculating the visual risk early warning degree via the grey-scale image to be analyzed includes performing Gaussian filtering on the grey-scale image to be analyzed to obtain a de-noised image, calculating the de-noised image to obtain a grey-scale gradient amplitude of each pixel pointe via a sobel operator, and performing assignment on each pixel point in the de-noised image via the grey-scale gradient amplitude to obtain a grey-scale gradient feature image;

calculating the grey-scale image to be analyzed through a second sliding window with a pre-set size of 5*5 to obtain a grey-scale mean value of a neighborhood pixel, calculating to obtain a grey-scale standard deviation of the neighborhood pixel based on the grey-scale mean value of the neighborhood pixel, and performing assignment on each pixel point in the grey-scale image to be analyzed through the grey-scale standard deviation of the neighborhood pixel to obtain a grey-scale discrete feature image; and obtaining an abnormal feature map by performing weighted linear mapping on each corresponding pixel point in the grey-scale gradient feature image through the grey-scale discrete feature image, ranking each pixel point value in the abnormal feature map from high to low, selecting a pixel point value of the first P % based on a pre-set proportion coefficient P % and calculating an average value to obtain a visual risk early warning degree;

the calculation expression thereof is as follows:

$$SNV(i, j) = \left( \sum_{m=i-2}^{i+2} \sum_{n=j-2}^{i+2} [I(m, n) - \mu(i, j)]^2 \right)^{1/2} / 5$$

$$DOA(i, j) = 1 - \left[ \sum_{i=1}^{i=x} \sum_{j=1}^{j=y} SNV(i, j) \cdot GFM(i, j) \right] / \sum_{i=1}^{i=x} \sum_{j=1}^{j=y} SNV(i, j)$$

where SNV (i, j) represents a pixel point grey-scale discrete value with coordinates of (i, j), (m, n) represents pixel point coordinates in a 5*5 neighborhood with coordinates of (i, j) as a center, I (m, n) represents a pixel point grey-scale value with coordinates of (m, n), μ (i, j) represents a neighborhood pixel grey-scale mean value with coordinates of (i, j) as a center, DOA (m, n) represents a pixel point value with coordinates of (i, j) in an abnormal feature map, β represents, and GFM (i, j) represents a pixel point gradient amplitude with coordinates of (i, j); x represents the total number of columns of pixel points of the grey-scale image to be analyzed, and y represents the total number of rows of pixel points of the grey-scale image to be analyzed.

As a preferred embodiment of the body-contact safety warning system based on a potential risk of automatic driving according to the present invention, the motion data analysis unit is used for calculating the vehicle motion data set to obtain a predicted vehicle body stability degree, calculating to obtain a load transfer rate based on horizontal acceleration data, vertical acceleration data, rotational angular velocity data and vertical load force data in the vehicle motion data set, calculating to obtain a vehicle body inclination angle through the load transfer rate, the wheel track of the vehicle and the height of center of gravity of the vehicle, performing derivation calculation on the vehicle body inclination angle to obtain a first order derivative of the vehicle body inclination angle and a second order derivative of the vehicle body inclination angle, and calculating to obtain a predicted inclination angle based on the pre-set critical time, the real-time vehicle body inclination angle, the first order derivative of vehicle body inclination angle and the second order derivative of vehicle body inclination angle, and calculating to obtain a predicted vehicle body stability degree by the stability degree model.

As a preferable aspect of a body-contact safety warning system based on a potential risk of automatic driving according to the present invention, a logic for calculating to obtain the predicted vehicle body stability degree by the stability degree model includes:

when the second order derivative of the vehicle body inclination angle is not equal to 0, calculating the predicted inclination angle, the vehicle body inclination angle, the first order derivative of the vehicle body inclination angle, the second order derivative of the vehicle body inclination angle and the vehicle body inclination angle and the pre-set critical time by a first piecewise expression in the stability degree model to obtain a predicted vehicle body stability degree;

when the second order derivative of the vehicle body inclination angle is equal to 0 and the first order derivative of the inclination angle is not equal to 0, calculating the predicted inclination angle, the vehicle body inclination angle, the first order derivative of the vehicle body inclination angle, the second order derivative of the vehicle body inclination angle and the vehicle body inclination angle and the pre-set critical time by a first piecewise expression in the stability degree model to obtain a predicted vehicle body stability degree;

when the second order derivative of the vehicle body inclination angle is equal to 0 and the first order derivative of the inclination angle is equal to 0, predicting the vehicle body stability degree by a third piecewise expression in the stability degree model; the calculation expression thereof is as follows:

$$PTA = A(t) + \alpha_1 T_{TH} \dot{A}(t) + \alpha_2 T_{TH}^2 \ddot{A}(t)$$

$$PSL = \begin{cases} lg(vm)\left[\sqrt{|2|PTA - A(t)| \cdot \ddot{A}(t) - (\dot{A}(t))^2|} - \dot{A}(t)\right]/\ddot{A}(t), \ddot{A}(t) \neq 0 \\ \dfrac{lg(vm)|PTA - A(t)|}{\dot{A}(t)}, \ddot{A}(t) = 0 \text{ and } \dot{A}(t) \neq 0 \\ lg(vm)PTA, \ddot{A}(t) = 0 \text{ and } \dot{A}(t) = 0 \end{cases}$$

where PSL represents a predicted vehicle body stability degree, PTA represents a predicted inclination angle, t represents time, A(t) represents a vehicle body inclination angle, $\alpha_1$ represents a first weight value, represents a pre-set critical time, $\dot{A}(t)$ represents the first order derivative of the vehicle body inclination angle, $\alpha_2$ represents a second weight value, $\ddot{A}(t)$ represents the second order derivative of the vehicle body inclination angle, lg represents a logarithmic function with 10 as the base number, v represents a vehicle speed, and m represents a vehicle mass.

As a preferred solution of a body-contact safety warning system based on a potential risk of automatic driving according to the present invention, where the transmission data analysis unit is used for analyzing and calculating the communication transmission data to obtain a communication data packet distortion degree, and decoding and identifying the communication transmission data to obtain special instruction data;

reading and matching an instruction code of the communication transmission data based on the communication transmission interface and a data type identifier to obtain special instruction data, where the special instruction data includes an automatic driving level reduction instruction, a local map failure instruction, an emergency avoidance instruction, a planned path change instruction, an application update supporting instruction and an inter-vehicle cooperation instruction, where the communication transmission interface includes an on-vehicle sensor data API, vehicle condition information API, a map platform API and a software application supporting API;

a processing logic for analyzing and calculating the communication transmission data to obtain a communication data packet distortion degree includes: calculating to obtain a received signal-to-noise ratio through pre-set communication evaluation time, communication transmission data signal power and noise power, calculating to obtain a signal strength fluctuation variance corresponding to the communication transmission data through pre-set communication evaluation time and a received signal strength indication, calculating to obtain an average data packet delay rate through pre-set communication evaluation time, a data packet receiving time stamp and a data packet sending time stamp of the communication transmission data, calculating to obtain a data packet integrity through pre-set communication evaluation time, a total number of data packet sending of the communication transmission data and a total number of data packet receiving of the communication transmission data, and calculating to obtain a communication packet distortion degree through the received signal-to-noise ratio, signal strength fluctuation variance, average packet delay rate and the packet integrity, and the calculation expression thereof is as follows:

$$DCE = \gamma_1(RSN - RSN_{TH}) + \gamma_2(VSF - VSF_{TH}) + \gamma_3(APD - APD_{TH}) + \gamma_4(COP - COP_{TH})$$

where DCE represents a communication data packet distortion degree, RSN represents a received signal-to-noise ratio, $RSN_{TH}$ represents a received signal-to-noise ratio threshold, $\gamma_1$ represents a received signal-to-noise ratio coefficient, VSF represents a signal strength fluctuation variance, $VSF_{TH}$ represents a signal strength fluctuation variance threshold, $\gamma_2$ represents a signal strength fluctuation variance coefficient, APD represents an average data packet delay rate, $APD_{TH}$ represents an average data packet delay rate threshold, $\gamma_3$ represents an average data packet delay rate coefficient, COP represents a data packet integrity, $COP_{TH}$ represents a data packet integrity threshold, and $\gamma_4$ represents a data packet integrity coefficient.

As a preferred embodiment of the body-contact safety warning system based on a potential risk of automatic driving according to the present invention, where the classification early warning unit is used for classifying and judging to obtain an early warning result according to the visual risk early warning degree, the predicted vehicle body stability degree, the communication data packet distortion degree and the special instruction data, and a calculation logic for classifying and judging includes:

when the visual risk early warning degree is less than a pre-set first visual risk early warning degree threshold, obtaining an early warning result that no early warning is required;

when the visual risk early warning degree is greater than or equal to a pre-set first threshold and is less than a pre-set second visual risk early warning degree threshold, obtaining an early warning result as a first level early warning;

when the visual risk early warning degree is greater than a pre-set second visual risk early warning degree threshold, obtaining an early warning result as a second level early warning;

when the predicted vehicle body stability degree is less than a pre-set first predicted vehicle body stability degree threshold, obtaining an early warning result that no early warning is required;

when the predicted vehicle body stability degree is greater than or equal to a pre-set first predicted vehicle body stability degree threshold and is less than a pre-set second predicted vehicle body stability degree threshold, obtaining an early warning result as a second level early warning;

when the predicted vehicle body stability degree is greater than a pre-set second predicted vehicle body stability degree threshold, obtaining an early warning result as a third level early warning;

when the communication data packet distortion degree is less than or equal to a pre-set first communication data packet distortion degree threshold, obtaining an early warning result that no early warning is required;

when the communication data packet distortion degree is greater than or equal to a pre-set first communication data packet distortion degree threshold and is less than a pre-set second communication data packet distortion degree threshold, obtaining an early warning result as a first level early warning;

when the communication data packet distortion degree is greater than a pre-set second communication data packet distortion degree threshold, obtaining an early warning result as a second level early warning;

when there are a planned path change instruction, a local map failure instruction, an application update supporting instruction and an inter-vehicle cooperation instruction in the special instruction data, obtaining an early warning result as a first level early warning; and when there are an automatic driving level reduction instruction and an emergency avoidance instruction in the special instruction data, obtaining an early warning result as a second level early warning.

As a preferred embodiment of a body-contact safety warning system based on a potential risk of automatic driving according to the present invention, the physical vibration unit is used for sending a safety warning to the driver according to the early warning result output by the classification early warning unit, and the safety warning is in form of vibration reminding and tension reminding;

when the early warning result received is that no early warning is required, the physical vibration unit remains in standby;

when the early warning result is received as is a first level early warning, the physical vibration unit initiates a primary vibration early warning mode, a seat belt of a main driver's seat is tightened based on a first strength, vibration belts on the seat belt of the main driver's seat and in the seat starts vibrating based on the primary vibration strength and the primary vibration frequency, stops vibrating for $T_2$ seconds after vibrating for $T_1$ seconds, and repeats N times, the vibration belts on the seat belt and in the seat automatically stop vibrating, and the seat belt stops tightening;

when an early warning result is received as a second level early warning, the physical vibration unit initiates an advanced vibration early warning mode, all the seat safety belts are tightened based on the second strength, the vibration belts on the safety belt of the main driver's seat and in the seat start continuous vibration based on the advanced vibration strength and the advanced vibration frequency, a grip force of the steering wheel is acquired by a grip force sensor in the steering wheel, and when the grip force of the steering wheel is greater than or equal to a pre-set grip force threshold, the vibration belts on the safety belt and in the seat stop vibrating, and the safety belt stops tightening; and when the early warning result is received as a third level early warning, all the seat belts are tightened based on the third strength until the driver manually enters an early warning-off instruction or the seat belt stops tightening at the end of the third level early warning.

As a preferred solution of a body-contact safety warning system based on a potential risk of automatic driving according to the present invention, the interaction unit is used for providing a visual interaction page to a user and receiving a user operation instruction, where the user operation instruction includes an early warning off instruction, an instruction for setting a system pre-set parameter and an instruction for querying historical record data; and the storage unit is used for storing the received data of the data receiving module, the output data of the data processing module, the output data of the safety warning module and the output data of the interaction unit data.

Advantageous effects of the present invention: the present invention improves that data is directly obtained from a camera terminal, a sensor terminal and a vehicle-mounted communication terminal, but image data is obtained when data is transmitted to a vehicle automatic driving system, ensuring that the early warning system of the present invention receives the same data set as the vehicle's own automatic driving system, facilitating accurate analysis. The present invention does not analyze road conditions for specific image contents, but focuses on judging the quality of an image received by an automatic driving system. By calculating the visual risk early warning degree, the problems such as image data error, image blur, low visibility of vehicle environment and sudden change of light intensity are fully considered, and the computational complexity is effectively reduced and the timeliness of early warning is improved. The calculation of the predicted vehicle body stability degree is beneficial to the accurate quantitative evaluation of the vehicle stability degree, and sufficient reaction time is reserved for the driver through pre-set critical time, which improves the robustness of the automatic driving system in the complex environment and abnormal situations. The analysis of transmission data from two aspects of communication data packet distortion degree and identification of special instruction data is helpful to identify the key instructions for the automatic driving system to change the vehicle condition accurately, and to evaluate the communication status comprehensively so as to discover the potential risks related to abnormal communication in time. First level early warning, second level early warning and third level early warning are conducted for different risk levels through hierarchical early warning mechanism, and corresponding primary and advanced vibration early warning modes are initiated. At the same time, the vibration of the safety belt can be noticed in time without disturbing the normal vision and operation of the driver, which is more targeted and effective than the traditional acousto-optic reminding method.

DETAILED DESCRIPTION OF THE EMBODIMENTS

Figure 1:
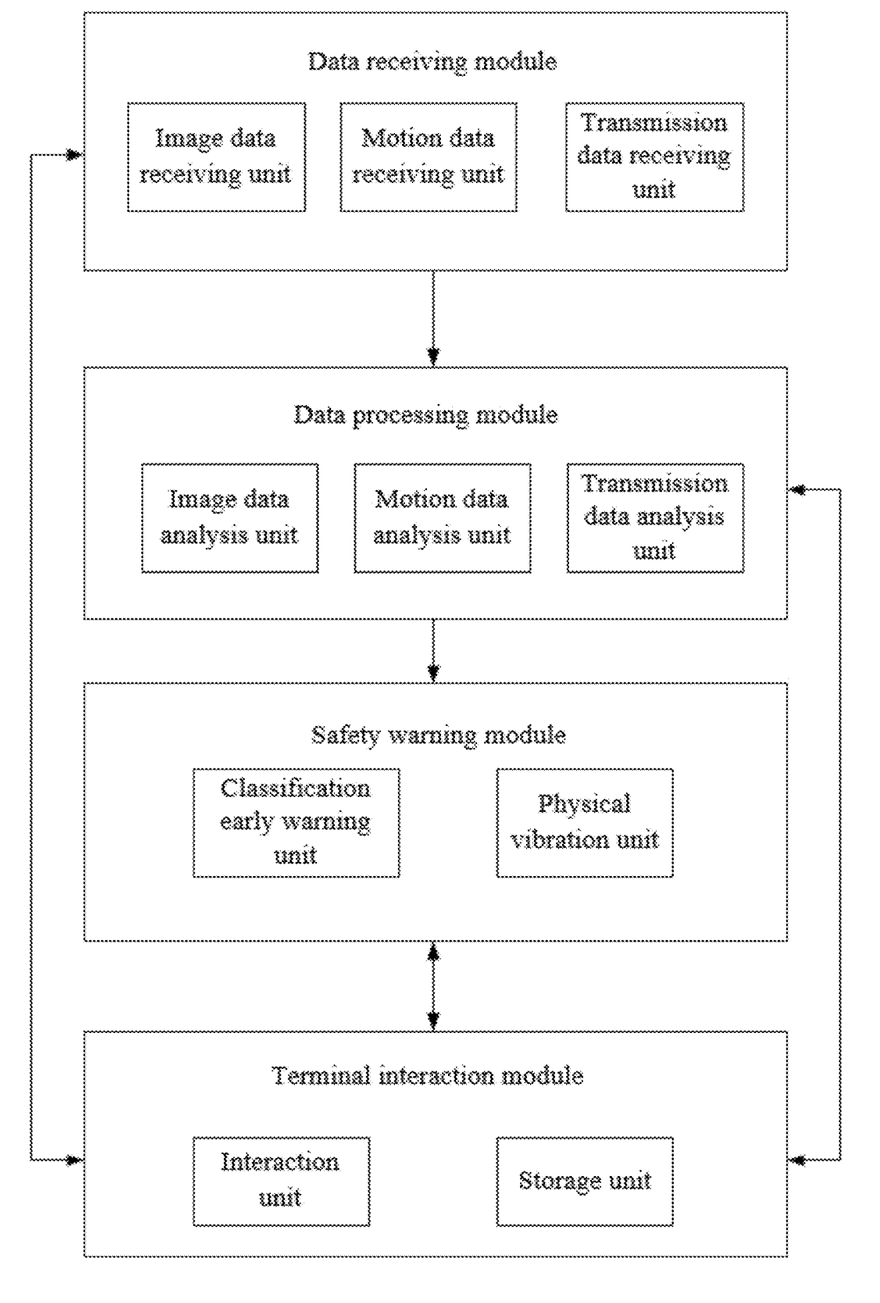
The FIGURE is a basic flow diagram showing a body-contact safety warning system based on a potential risk of automatic driving according to an embodiment of the present invention.

In order that the objects, features and advantages of the present invention will become more apparent, a detailed description of embodiments of the present invention will be rendered by reference to the accompanying drawings, it is to be understood that the described embodiments are part of, but not all of, the present invention.

Referring to the FIGURE, for one embodiment of the present invention, a body-contact safety warning system based on a potential risk of automatic driving is provided, which includes a data receiving module, a data processing module, a safety warning module and a terminal interaction module; where the data receiving module includes an image data receiving unit used for receiving a real-time image acquired by the vehicle-mounted camera to obtain an image data set, a motion data receiving unit used for receiving the vehicle motion data set acquired by a vehicle motion sensor and a transmission data receiving unit used for receiving communication transmission data transmitted by a vehicle automatic driving system from a communication transmission interface;

the data processing module includes an image data analysis unit used for calculating the image data set to obtain a visual risk early warning degree, a motion data analysis unit used for calculating the vehicle motion data set to obtain a predicted vehicle body stability degree and a transmission data analysis unit used for analyzing and calculating communication transmission data to obtain a communication data packet distortion degree and special instruction data;

the safety warning module includes a classification early warning unit used for performing classification judgment according to the visual risk early warning degree, the predicted vehicle body stability degree, the communication data packet distortion degree and the special instruction data to obtain an early warning result, and a physical vibration unit used for sending a safety warning to a driver according to the early warning result; and the terminal interaction module includes an interaction unit and a storage unit used for providing a visual interaction page to a user and receiving a user operation instruction, and storing received data of the data receiving module, output data of the data processing module, output data of the safety warning module and output data of the interaction unit data.

In this embodiment, the system is characterized in that the image data receiving unit is used for receiving a real-time image acquired by the vehicle-mounted camera to obtain an image data set, and the vehicle-mounted camera includes a front view camera, a rear-view camera, a surround view camera and a side view camera;

the motion data receiving unit is used for receiving the vehicle motion data set acquired by the vehicle motion sensor, where the vehicle motion sensor includes a speed sensor, an acceleration sensor, a gyroscope and a pressure sensor, and the vehicle motion data set includes vehicle speed data, horizontal acceleration data, vertical acceleration data, rotational angular velocity data and vertical load force data;

the transmission data receiving unit is used for acquiring communication transmission data transmitted by the vehicle automatic driving system from the communication transmission interface, where the communication transmission interface includes a vehicle-mounted sensor data API, vehicle condition information API, a map platform API and a software application supporting API, and the communication transmission data includes vehicle-mounted sensor transmission data, vehicle condition information transmission data, map platform transmission data and software application supporting transmission data;

Embodiment: when a vehicle automatic driving system is running, there is a case where the camera terminal, the sensor terminal and the vehicle-mounted communication terminal work normally, but the transmission line fails, resulting in data error. The vehicle automatic driving system receives the error data, then performs calculation processing according to the error data, and there is a need for early warning. The traditional early warning system collects data directly through the terminal. In this case, it is easy to obtain an early warning result that no early warning is required, which is inconsistent with the actual situation, resulting in a problem of absent early warning. The present invention changes to obtain data directly from the camera terminal, the sensor terminal and the vehicle-mounted communication terminal, and to obtain image data when data is transmitted to the vehicle automatic driving system, ensuring that the early warning system of the present invention receives the same image data set, vehicle motion data set and transmission data set as the vehicle automatic driving system.

In the present embodiment, the image data analysis unit is used for calculating the image data set to obtain a visual risk early warning degree, sampling the image data set via a first sliding window with a pre-set K frame length to obtain a sampling image set, respectively adding a corresponding time stamp to each frame image in the sampling image set to obtain an image sequence to be analyzed, performing grey-scale mapping on the image sequence to be analyzed via a weighted average method to obtain a grey-scale image to be analyzed, and calculating to obtain the visual risk early warning degree via the grey-scale image to be analyzed.

Embodiment: the sampling image set includes images of a total number of successive K frames from the current frame image to the previous K−1 frame image, facilitating the analysis of dynamic changes in the quality of the acquired images.

In the present embodiment, a logic for obtaining the visual risk early warning degree by calculating the grey-scale image to be analyzed includes:

Gaussian filtering is performed on the grey-scale image to be analyzed to obtain a de-noised image, a grey-scale gradient amplitude of each pixel point on the de-noised image is obtained by calculation via a sobel operator, and assignment is performed on each pixel point in the de-noised image via the grey-scale gradient amplitude to obtain a grey-scale gradient feature image;

the grey-scale image to be analyzed is calculated through a second sliding window with a pre-set size of 5*5 to obtain a grey-scale mean value of a neighborhood pixel, a grey-scale standard deviation of the neighborhood pixel is obtained by calculation based on the grey-scale mean value of the neighborhood pixel, and assignment is performed on each pixel point in the grey-scale image to be analyzed through the grey-scale standard deviation of the neighborhood pixel to obtain a grey-scale discrete feature image; and the calculation expression for performing grey-scale mapping on an environment image by a weighted average method is as follows:

$$\text{Gray} = 0.299R + 0.587G + 0.114B$$

where Grey represents a grey-scale value of a pixel point after the grey-scale mapping, R represents a red component of the pixel point before the grey-scale mapping, G represents a green component of the pixel point before the grey-scale mapping, and B represents a blue component of the pixel point before the grey-scale mapping.

an abnormal feature map is obtained by performing weighted linear mapping on each corresponding pixel point in the grey-scale gradient feature image through the grey-scale discrete feature image, each pixel point value in the abnormal feature map is ranked from high to low, a pixel point value of the first P % is selected based on a pre-set proportion coefficient P % and an average value is calculated to obtain a visual risk early warning degree;

the calculation expression thereof is as follows:

$$SNV(i, j) = \left(\sum_{m=i-2}^{i+2}\sum_{n=j-2}^{i+2}[I(m, n) - \mu(i, j)]^2\right)^{1/2}/5$$

$$DOA(i, j) = 1 - \left[\sum_{i=1}^{i=x}\sum_{j=1}^{j=y}SNV(i, j) \cdot GFM(i, j)\right]/\sum_{i=1}^{i=x}\sum_{j=1}^{j=y}SNV(i, j)$$

where SNV (i, j) represents a pixel point grey-scale discrete value with coordinates of (i, j), (m, n) represents pixel point coordinates in a 5*5 neighborhood with coordinates of (i, j) as a center, I (m, n) represents a pixel point grey-scale value with coordinates of (m, n), μ (i, j) represents a neighborhood pixel grey-scale mean value with coordinates of (i, j) as a center, DOA (m, n) represents a pixel point value with coordinates of (i, j) in an abnormal feature map, β represents, and GFM (i, j) represents a pixel point gradient amplitude with coordinates of (i, j); X represents the total number of columns of pixel points of the grey-scale image to be analyzed, and y represents the total number of rows of pixel points of the grey-scale image to be analyzed.

Image analysis is the key technology of road condition judgment in the automatic driving system, which depends on the support of real-time high-definition image. The present invention does not analyze road conditions for specific image contents, but focuses on judging the quality of an image received by an automatic driving system. By calculating the visual risk early warning degree, the problems such as image data error, image blur, low visibility of vehicle environment and sudden change of light intensity are repeatedly considered, and the computational complexity is effectively reduced and the timeliness of early warning is improved.

In the present embodiment, the motion data analysis unit is used for calculating the vehicle motion data set to obtain a predicted vehicle body stability degree, calculating to obtain a load transfer rate based on horizontal acceleration data, vertical acceleration data, rotational angular velocity data and vertical load force data in the vehicle motion data set, calculating to obtain a vehicle body inclination angle through the load transfer rate, the wheel track of the vehicle and the height of center of gravity of the vehicle, performing derivation calculation on the vehicle body inclination angle to obtain a first order derivative of the vehicle body inclination angle and a second order derivative of the vehicle body inclination angle, and calculating to obtain a predicted inclination angle based on the pre-set critical time, the real-time vehicle body inclination angle, the first order derivative of vehicle body inclination angle and the second order derivative of vehicle body inclination angle, and calculating to obtain a predicted vehicle body stability degree by the stability degree model.

In the present embodiment, a logic for calculating to obtain the predicted vehicle body stability degree by the stability degree model includes:

when the second order derivative of the vehicle body inclination angle is not equal to 0, calculating the predicted inclination angle, the vehicle body inclination angle, the first order derivative of the vehicle body inclination angle, the second order derivative of the vehicle body inclination angle and the vehicle body inclination angle and the pre-set critical time by a first piecewise expression in the stability degree model to obtain a predicted vehicle body stability degree;

when the second order derivative of the vehicle body inclination angle is equal to 0 and the first order derivative of the inclination angle is not equal to 0, calculating the predicted inclination angle, the vehicle body inclination angle, the first order derivative of the vehicle body inclination angle, the second order derivative of the vehicle body inclination angle and the vehicle body inclination angle and the pre-set critical time by a first piecewise expression in the stability degree model to obtain a predicted vehicle body stability degree;

when the second order derivative of the vehicle body inclination angle is equal to 0 and the first order derivative of the inclination angle is equal to 0, predicting the vehicle body stability degree by a third piecewise expression in the stability degree model;

the calculation expression thereof is as follows:

$$PTA = A(t) + \alpha_1 T_{TH} \dot{A}(t) + \alpha_2 T_{TH}^2 \ddot{A}(t)$$

$$PSL = \begin{cases} lg(vm)\left[\sqrt{|2|PTA - A(t)| \cdot \ddot{A}(t) - (\dot{A}(t)^2|} - \dot{A}(t)\right]/\ddot{A}(t), \ddot{A}(t) \neq 0 \\ \dfrac{lg(vm)|PTA - A(t)|}{\dot{A}(t)}, \ddot{A}(t) = 0 \text{ and } \dot{A}(t) \neq 0 \\ lg(vm)PTA, \ddot{A}(t) = 0 \text{ and } \dot{A}(t) = 0 \end{cases}$$

where PSL represents a predicted vehicle body stability degree, PTA represents a predicted inclination angle, t represents time, A(t) represents a vehicle body inclination angle, $\alpha_1$ represents a first weight value, represents a pre-set critical time, $\dot{A}(t)$ represents the first order derivative of the vehicle body inclination angle, $\alpha_2$ represents a second weight value, $\ddot{A}(t)$ represents the second order derivative of the vehicle body inclination angle, lg represents a logarithmic function with 10 as the base number, v represents a vehicle speed, and m represents a vehicle mass.

The calculation of the predicted vehicle body stability degree is beneficial to the accurate quantitative evaluation of the vehicle stability degree, and sufficient reaction time is reserved for the driver through pre-set critical time, which improves the robustness of the automatic driving system in the complex environment and abnormal situations.

In the present embodiment, the transmission data analysis unit is used for analyzing and calculating the communication transmission data to obtain a communication data packet distortion degree, and decoding and identifying the communication transmission data to obtain special instruction data;

reading and matching an instruction code of the communication transmission data based on the communication transmission interface and a data type identifier to obtain special instruction data, where the special instruction data includes an automatic driving level reduction instruction, a local map failure instruction, an emergency avoidance instruction, a planned path change instruction, an application update supporting instruction and an inter-vehicle cooperation instruction, where the communication transmission interface includes an on-vehicle sensor data API, vehicle condition information API, a map platform API and a software application supporting API;

a processing logic for analyzing and calculating the communication transmission data to obtain a communication data packet distortion degree includes: calculating to obtain a received signal-to-noise ratio through pre-set communication evaluation time, communication transmission data signal power and noise power, calculating to obtain a signal strength fluctuation variance corresponding to the communication transmission data through pre-set communication evaluation time and a received signal strength indication, calculating to obtain an average data packet delay rate through pre-set communication evaluation time, a data packet receiving time stamp and a data packet sending time stamp of the communication transmission data, calculating to obtain a data packet integrity through pre-set communication evaluation time, a total number of data packet sending of the communication transmission data and a total number of data packet receiving of the communication transmission data, and calculating to obtain a communication packet distortion degree through the received signal-to-noise ratio, signal strength fluctuation variance, average packet delay rate and the packet integrity, and the calculation expression thereof is as follows:

$$DCE=\gamma_1(RSN-RSN_{TH})+\gamma_2(VSF-VSF_{TH})+\gamma_3(APD-APD_{TH})+\gamma_4(COP-COP_{TH})$$

where DCE represents a communication data packet distortion degree, RSN represents a received signal-to-noise ratio, $RSN_{TH}$ represents a received signal-to-noise ratio threshold, $\gamma_1$ represents a received signal-to-noise ratio coefficient, VSF represents a signal strength fluctuation variance, $VSF_{TH}$ represents a signal strength fluctuation variance threshold, $\gamma_2$ represents a signal strength fluctuation variance coefficient, APD represents an average data packet delay rate, $APD_{TH}$ represents an average data packet delay rate threshold, $\gamma_3$ represents an average data packet delay rate coefficient, COP represents a data packet integrity, $COP_{TH}$ represents a data packet integrity threshold, and $\gamma_4$ represents a data packet integrity coefficient.

The analysis of transmission data from two aspects of communication data packet distortion degree and identification of special instruction data is helpful to identify the key instructions for the automatic driving system to change the vehicle condition accurately, and to evaluate the communication status comprehensively so as to discover abnormal communication in time.

In the present embodiment, the classification early warning unit is used for classifying and judging to obtain an early warning result according to the visual risk early warning degree, the predicted vehicle body stability degree, the communication data packet distortion degree and the special instruction data, and a calculation logic for classifying and judging includes:

when the visual risk early warning degree is less than a pre-set first visual risk early warning degree threshold, an early warning result that no early warning is required is obtained;

when the visual risk early warning degree is greater than or equal to a pre-set first threshold and is less than a pre-set second visual risk early warning degree threshold, an early warning result is obtained as a first level early warning;

when the visual risk early warning degree is greater than a pre-set second visual risk early warning degree threshold, an early warning result is obtained as a second level early warning;

when the predicted vehicle body stability degree is less than a pre-set first predicted vehicle body stability degree threshold, an early warning result that no early warning is required is obtained;

when the predicted vehicle body stability degree is greater than or equal to a pre-set first predicted vehicle body stability degree threshold and is less than a pre-set second predicted vehicle body stability degree threshold, an early warning result is obtained as a second level early warning;

when the predicted vehicle body stability degree is greater than a pre-set second predicted vehicle body stability degree threshold, an early warning result is obtained as a third level early warning;

when the communication data packet distortion degree is less than or equal to a pre-set first communication data packet distortion degree threshold, an early warning result that no early warning is required is obtained;

when the communication data packet distortion degree is greater than or equal to a pre-set first communication data packet distortion degree threshold and is less than a pre-set second communication data packet distortion degree threshold, an early warning result is obtained as a first level early warning;

when the communication data packet distortion degree is greater than a pre-set second communication data packet distortion degree threshold, an early warning result is obtained as a second level early warning;

when there are a planned path change instruction, a local map failure instruction, an application update supporting instruction and an inter-vehicle cooperation instruction in the special instruction data, an early warning result is obtained as a first level early warning; and when there are an automatic driving level reduction instruction and an emergency avoidance instruction in the special instruction data, an early warning result is obtained as a second level early warning.

In the present embodiment, the physical vibration unit is used for sending a safety warning to the driver according to the early warning result output by the classification early warning unit, and the safety warning is in form of vibration reminding and tension reminding;

when the early warning result received is that no early warning is required, the physical vibration unit remains in standby;

when the early warning result is received as is a first level early warning, the physical vibration unit initiates a primary vibration early warning mode, a seat belt of a main driver's seat is tightened based on a first strength, vibration belts on the seat belt of the main driver's seat and in the seat starts vibrating based on the primary vibration strength and the primary vibration frequency, stops vibrating for $T_2$ seconds after vibrating for $T_1$ seconds, and repeats N times, the vibration belts on the seat belt and in the seat automatically stop vibrating, and the seat belt stops tightening;

when an early warning result is received as a second level early warning, the physical vibration unit initiates an advanced vibration early warning mode, all the seat safety belts are tightened based on the second strength, the vibration belts on the safety belt of the main driver's seat and in the seat start continuous vibration based on the advanced vibration strength and the advanced vibration frequency, a grip force of the steering wheel is acquired by a grip force sensor in the steering wheel, and when the grip force of the steering wheel is greater than or equal to a pre-set grip force threshold, the vibration belts on the safety belt and in the seat stop vibrating, and the safety belt stops tightening; and when the early warning result is received as a third level early warning, all the seat belts are tightened based on the third strength until the driver manually enters an early warning-off instruction or the seat belt stops tightening at the end of the third level early warning.

The first level early warning and the second level early warning are conducted for different risk levels through a hierarchical early warning mechanism, and the corresponding primary vibration early warning and advanced vibration early warning modes are initiated. At the same time, the vibration of the safety belt can be noticed in time without disturbing the normal vision and operation of the driver, which is more targeted and effective than the traditional acousto-optic reminding method. In addition, the third level early warning is added to realize that all seats are tightened the safety belt to prevent vehicle impact, and this state will continue until the end of the third level early warning state, which is beneficial to protect the safety of passengers in the event of rollover or impact.

In the present embodiment, the interaction unit is used for providing a visual interaction page to a user and receiving a user operation instruction, where the user operation instruction includes an early warning off instruction, an instruction for setting a system pre-set parameter and an instruction for querying historical record data; and the storage unit is used for storing the received data of the data receiving module, the output data of the data processing module, the output data of the safety warning module and the output data of the interaction unit data.

A person skilled in the art will appreciate that embodiments of the present invention may provide methods, systems, or computer program products. Accordingly, the present invention may take the form of an entirely hardware embodiment, an entirely software embodiment or an embodiment combining software and hardware aspects. Moreover, the present invention can take the form of a computer program product embodied on one or more computer-usable storage media having computer-usable program code embodied therein. The storage medium may be implemented by any type or combination of volatile or non-volatile memory devices, such as Static Random Access Memory (SRAM), Electrically Erasable Programmable Read-Only Memory (EEPROM), Erasable Programmable Read Only Memory (EPROM), Programmable Red-Only Memory (PROM), Read-Only Memory (ROM), magnetic memory, flash memory, magnetic or optical disk. These computer program instructions may also be stored in a computer-readable memory that can direct a computer or other programmable data processing device to function in a particular manner, so that the instructions stored in the computer-readable memory produce an article of manufacture including instruction means which implement the function specified in the flowchart flow or flows and/or block diagram block or blocks.

It should be noted that the above-mentioned embodiments illustrate rather than limit the present invention, and that a person skilled in the art will appreciate that modifications and equivalents may be made thereto without departing from the spirit and scope of the present invention as defined by the appended claims.

What is claimed is:

1. A body-contact safety warning system based on a potential risk of automatic driving, comprising: a data receiving module, a data processing module, a safety warning module and a terminal interaction module; wherein the data receiving module comprises an image data receiving unit used for receiving a real-time image acquired by the vehicle-mounted camera to obtain an image data set, a motion data receiving unit used for receiving the vehicle motion data set acquired by a vehicle motion sensor and a transmission data receiving unit used for receiving communication transmission data transmitted by a vehicle automatic driving system from a communication transmission interface;

the data processing module comprises an image data analysis unit used for calculating the image data set to obtain a visual risk early warning degree, a motion data analysis unit used for calculating the vehicle motion data set to obtain a predicted vehicle body stability degree and a transmission data analysis unit used for analyzing and calculating communication transmission data to obtain a communication data packet distortion degree and special instruction data;

the safety warning module comprises a classification early warning unit used for performing classification judgment according to the visual risk early warning degree, the predicted vehicle body stability degree, the communication data packet distortion degree and the special instruction data to obtain an early warning result, and a physical vibration unit used for sending a safety warning to a driver according to the early warning result; and the terminal interaction module comprises an interaction unit and a storage unit used for providing a visual interaction page to a user and receiving a user operation instruction, and storing received data of the data receiving module, output data of the data processing module, output data of the safety warning module and output data of the interaction unit data;

wherein the image data receiving unit is used for receiving a real-time image acquired by the vehicle-mounted camera to obtain an image data set, and the vehicle-mounted camera comprises a front view camera, a rear-view camera, a surround view camera and a side view camera;

the motion data receiving unit is used for receiving the vehicle motion data set acquired by the vehicle motion sensor, wherein the vehicle motion sensor comprises a speed sensor, an acceleration sensor, a gyroscope and a pressure sensor, and the vehicle motion data set comprises vehicle speed data, horizontal acceleration data, vertical acceleration data, rotational angular velocity data and vertical load force data;

the transmission data receiving unit is used for acquiring communication transmission data transmitted by the vehicle automatic driving system from the communication transmission interface, wherein the communication transmission interface comprises a vehicle-mounted sensor data API, vehicle condition information API, a map platform API and a software application supporting API, and the communication transmission data comprises vehicle-mounted sensor transmission data, vehicle condition information transmission data, map platform transmission data and software application supporting transmission data.

2. The body-contact safety warning system based on a potential risk of automatic driving according to claim 1, wherein the image data analysis unit is used for calculating the image data set to obtain a visual risk early warning degree, sampling the image data set via a first sliding window with a pre-set K frame length to obtain a sampling image set, respectively adding a corresponding time stamp to each frame image in the sampling image set to obtain an image sequence to be analyzed, performing grey-scale mapping on the image sequence to be analyzed via a weighted average method to obtain a grey-scale image to be analyzed, and calculating to obtain the visual risk early warning degree via the grey-scale image to be analyzed.

3. The body-contact safety warning system based on a potential risk of automatic driving according to claim 2, wherein the calculating the visual risk early warning degree via the grey-scale image to be analyzed comprises:
performing Gaussian filtering on the grey-scale image to be analyzed to obtain a de-noised image, calculating the de-noised image to obtain a grey-scale gradient amplitude of each pixel pointe via a sobel operator, and performing assignment on each pixel point in the de-noised image via the grey-scale gradient amplitude to obtain a grey-scale gradient feature image;
calculating the grey-scale image to be analyzed through a second sliding window with a pre-set size of 5*5 to obtain a grey-scale mean value of a neighborhood pixel, calculating to obtain a grey-scale standard deviation of the neighborhood pixel based on the grey-scale mean value of the neighborhood pixel, and performing assignment on each pixel point in the grey-scale image to be analyzed through the grey-scale standard deviation of the neighborhood pixel to obtain a grey-scale discrete feature image; and
obtaining an abnormal feature map by performing weighted linear mapping on each corresponding pixel point in the grey-scale gradient feature image through the grey-scale discrete feature image, ranking each pixel point value in the abnormal feature map from high to low, selecting a pixel point value of the first P % based on a pre-set proportion coefficient P % and calculating an average value to obtain a visual risk early warning degree;
the calculation expression thereof is as follows:

$$SNV(i,j) = \left( \sum_{m=i-2}^{i+2} \sum_{n=j-2}^{j+2} [I(m,n) - \mu(i,j)]^2 \right)^{1/2} \Big/ 5$$

$$DOA(i,j) = 1 - \left[ \sum_{i=1}^{i=x} \sum_{j=1}^{j=y} SNV(i,j) \cdot GFM(i,j) \right] \Big/ \sum_{i=1}^{i=x} \sum_{j=1}^{j=y} SNV(i,j)$$

wherein SNV (i, j) represents a pixel point grey-scale discrete value with coordinates of (i, j), (m, n) represents pixel point coordinates in a 5*5 neighborhood with coordinates of (i, j) as a center, I (m, n) represents a pixel point grey-scale value with coordinates of (m, n), µ (i, j) represents a neighborhood pixel grey-scale mean value with coordinates of (i, j) as a center, DOA (m, n) represents a pixel point value with coordinates of (i, j) in an abnormal feature map, and GFM (i, j) represents a pixel point gradient amplitude with coordinates of (i, j); x represents the total number of columns of pixel points of the grey-scale image to be analyzed, and y represents the total number of rows of pixel points of the grey-scale image to be analyzed.

4. The body-contact safety warning system based on a potential risk of automatic driving according to claim 1, wherein the motion data analysis unit is used for calculating the vehicle motion data set to obtain a predicted vehicle body stability degree, calculating to obtain a load transfer rate based on horizontal acceleration data, vertical acceleration data, rotational angular velocity data and vertical load force data in the vehicle motion data set, calculating to obtain a vehicle body inclination angle through the load transfer rate, the wheel track of the vehicle and the height of center of gravity of the vehicle, performing derivation calculation on the vehicle body inclination angle to obtain a first order derivative of the vehicle body inclination angle and a second order derivative of the vehicle body inclination angle, and calculating to obtain a predicted inclination angle based on the pre-set critical time, the real-time vehicle body inclination angle, the first order derivative of vehicle body inclination angle and the second order derivative of vehicle body inclination angle, and calculating to obtain a predicted vehicle body stability degree by the stability degree model.

5. The body-contact safety warning system based on a potential risk of automatic driving according to claim 4, wherein a logic for calculating to obtain the predicted vehicle body stability degree by the stability degree model comprises:
when the second order derivative of the vehicle body inclination angle is not equal to 0, calculating the predicted inclination angle, the vehicle body inclination angle, the first order derivative of the vehicle body inclination angle, the second order derivative of the vehicle body inclination angle and the pre-set critical time by a first piecewise expression in the stability degree model to obtain a predicted vehicle body stability degree;
when the second order derivative of the vehicle body inclination angle is equal to 0 and the first order derivative of the inclination angle is not equal to 0, calculating the predicted inclination angle, the vehicle body inclination angle, the first order derivative of the vehicle body inclination angle, the second order derivative of the vehicle body inclination angle and the pre-set critical time by a first piecewise expression in the stability degree model to obtain a predicted vehicle body stability degree;
when the second order derivative of the vehicle body inclination angle is equal to 0 and the first order derivative of the inclination angle is equal to 0, predicting the vehicle body stability degree by a third piecewise expression in the stability degree model;
the calculation expression thereof is as follows:

$$PTA = A(t) + \alpha_1 T_{TH} \dot{A}(t) + \alpha_2 T_{TH}^2 \ddot{A}(t)$$

wherein PSL represents a predicted vehicle body stability degree, PTA represents a predicted inclination angle, t represents time, A(t) represents a vehicle body inclination angle, $\alpha_1$ represents a first weight value, $T_{TH}$ represents a pre-set critical time, $\dot{A}(t)$ represents the first order derivative of the vehicle body inclination angle, $\alpha_2$ represents a second weight value, $\ddot{A}(t)$ represents the second order derivative of the vehicle body inclination angle, lg represents a logarithmic function with 10 as the base number, v represents a vehicle speed, and m represents a vehicle mass.

6. The body-contact safety warning system based on a potential risk of automatic driving according to claim 1, wherein the transmission data analysis unit is used for analyzing and calculating the communication transmission data to obtain a communication data packet distortion degree, and decoding and identifying the communication transmission data to obtain special instruction data;

reading and matching an instruction code of the communication transmission data based on the communication transmission interface and a data type identifier to obtain special instruction data, wherein the special instruction data comprises an automatic driving level reduction instruction, a local map failure instruction, an emergency avoidance instruction, a planned path change instruction, an application update supporting instruction and an inter-vehicle cooperation instruction;

the communication transmission interface comprises a vehicle-mounted sensor data API, a vehicle condition information API, a map platform API and a software application supporting API;

a processing logic for analyzing and calculating the communication transmission data to obtain a communication data packet distortion degree comprises: calculating to obtain a received signal-to-noise ratio through pre-set communication evaluation time, communication transmission data signal power and noise power, calculating to obtain a signal strength fluctuation variance corresponding to the communication transmission data through pre-set communication evaluation time and a received signal strength indication, calculating to obtain an average data packet delay rate through pre-set communication evaluation time, a data packet receiving time stamp and a data packet sending time stamp of the communication transmission data, calculating to obtain a data packet integrity through pre-set communication evaluation time, a total number of data packet sending of the communication transmission data and a total number of data packet receiving of the communication transmission data, and calculating to obtain a communication packet distortion degree through the received signal-to-noise ratio, signal strength fluctuation variance, average packet delay rate and the packet integrity, and the calculation expression thereof is as follows:

$$DCE=\gamma_1(RSN-RSN_{TH})+\gamma_2(VSF-VSF_{TH})+\gamma_3(APD-APD_{TH})+\gamma_4(COP-COP_{TH})$$

wherein DCE represents a communication data packet distortion degree, RSN represents a received signal-to-noise ratio, $RSN_{TH}$ represents a received signal-to-noise ratio threshold, $\gamma_1$ represents a received signal-to-noise ratio coefficient, VSF represents a signal strength fluctuation variance, $VSF_{TH}$ represents a signal strength fluctuation variance threshold, $\gamma_2$ represents a signal strength fluctuation variance coefficient, APD represents an average data packet delay rate, $APD_{TH}$ represents an average data packet delay rate threshold, $\gamma_3$ represents an average data packet delay rate coefficient, COP represents a data packet integrity, $COP_{TH}$ represents a data packet integrity threshold, and $\gamma_4$ represents a data packet integrity coefficient.

7. The body-contact safety warning system based on a potential risk of automatic driving according to claim 1, wherein the classification early warning unit is used for classifying and judging to obtain an early warning result according to the visual risk early warning degree, the predicted vehicle body stability degree, the communication data packet distortion degree and the special instruction data, and a calculation logic for classifying and judging comprises:

when the visual risk early warning degree is less than a pre-set first visual risk early warning degree threshold, obtaining an early warning result that no early warning is required;

when the visual risk early warning degree is greater than or equal to a pre-set first threshold and is less than a pre-set second visual risk early warning degree threshold, obtaining an early warning result as a first level early warning;

when the visual risk early warning degree is greater than a pre-set second visual risk early warning degree threshold, obtaining an early warning result as a second level early warning;

when the predicted vehicle body stability degree is less than a pre-set first predicted vehicle body stability degree threshold, obtaining an early warning result that no early warning is required;

when the predicted vehicle body stability degree is greater than or equal to a pre-set first predicted vehicle body stability degree threshold and is less than a pre-set second predicted vehicle body stability degree threshold, obtaining an early warning result as a second level early warning;

when the predicted vehicle body stability degree is greater than a pre-set second predicted vehicle body stability degree threshold, obtaining an early warning result as a third level early warning;

when the communication data packet distortion degree is less than or equal to a pre-set first communication data packet distortion degree threshold, obtaining an early warning result that no early warning is required;

when the communication data packet distortion degree is greater than or equal to a pre-set first communication data packet distortion degree threshold and is less than a pre-set second communication data packet distortion degree threshold, obtaining an early warning result as a first level early warning;

when the communication data packet distortion degree is greater than a pre-set second communication data packet distortion degree threshold, obtaining an early warning result as a second level early warning;

when there are a planned path change instruction, a local map failure instruction, an application update supporting instruction and an inter-vehicle cooperation instruction in the special instruction data, obtaining an early warning result as a first level early warning; and when there are an automatic driving level reduction instruction and an emergency avoidance instruction in the special instruction data, obtaining an early warning result as a second level early warning.

8. The body-contact safety warning system based on a potential risk of automatic driving according to claim 1, wherein the physical vibration unit is used for sending a safety warning to the driver according to the early warning result output by the classification early warning unit, and the safety warning is in form of vibration reminding and tension reminding;

when the early warning result received is that no early warning is required, the physical vibration unit remains in standby;

when the early warning result is received as is a first level early warning, the physical vibration unit initiates a primary vibration early warning mode, a seat belt of a main driver's seat is tightened based on a first strength, vibration belts on the seat belt of the main driver's seat and in the seat starts vibrating based on the primary vibration strength and the primary vibration frequency, stops vibrating for $T_2$ seconds after vibrating for $T_1$ seconds, and repeats N times, the vibration belts on the seat belt and in the seat automatically stop vibrating, and the seat belt stops tightening;

when an early warning result is received as a second level early warning, the physical vibration unit initiates an advanced vibration early warning mode, all the seat safety belts are tightened based on the second strength, the vibration belts on the safety belt of the main driver's seat and in the seat start continuous vibration based on the advanced vibration strength and the advanced vibration frequency, a grip force of the steering wheel is acquired by a grip force sensor in the steering wheel, and when the grip force of the steering wheel is greater than or equal to a pre-set grip force threshold, the vibration belts on the safety belt and in the seat stop vibrating, and the safety belt stops tightening; and when the early warning result is received as a third level early warning, all the seat belts are tightened based on the third strength until the driver manually enters an early warning-off instruction or the seat belt stops tightening at the end of the third level early warning.

9. The body-contact safety warning system based on a potential risk of automatic driving according to claim 1, wherein the interaction unit is used for providing a visual interaction page to a user and receiving a user operation instruction, wherein the user operation instruction comprises an early warning off instruction, an instruction for setting a system pre-set parameter and an instruction for querying historical record data; and the storage unit is used for storing the received data of the data receiving module, the output data of the data processing module, the output data of the safety warning module and the output data of the interaction unit data.

* * * * *